US008985550B2

(12) United States Patent
Miura

(10) Patent No.: US 8,985,550 B2
(45) Date of Patent: Mar. 24, 2015

(54) ELECTROMAGNETIC VALVE

(71) Applicant: Denso Corporation, Kariya-city, Aichi-pref. (JP)

(72) Inventor: Yuichiro Miura, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/197,827

(22) Filed: Mar. 5, 2014

(65) Prior Publication Data

US 2014/0183389 A1 Jul. 3, 2014

Related U.S. Application Data

(62) Division of application No. 13/365,506, filed on Feb. 3, 2012, now Pat. No. 8,757,587.

(30) Foreign Application Priority Data

Feb. 4, 2011 (JP) .................................. 2011-022509

(51) Int. Cl.
*F16K 31/02* (2006.01)
*F16K 31/06* (2006.01)
*H01F 7/08* (2006.01)

(52) U.S. Cl.
CPC ............. *F16K 31/0675* (2013.01); *F16K 31/06* (2013.01); *F16K 31/0658* (2013.01); *H01F 2007/085* (2013.01)
USPC ........................ 251/129.15; 335/281; 335/297

(58) Field of Classification Search
USPC ...................... 251/129.15; 335/236, 281, 297
See application file for complete search history.

(56) References Cited

U.S. PATENT DOCUMENTS

| 6,484,998 B1 | 11/2002 | Schaffer |
| 6,601,822 B2 | 8/2003 | Tachibana et al. |
| 6,761,290 B2 | 7/2004 | Righolt et al. |
| 7,468,647 B2 | 12/2008 | Ishibashi et al. |
| 7,819,380 B2 | 10/2010 | Sugiyama et al. |
| 7,866,625 B2 | 1/2011 | Lee et al. |
| 8,028,970 B2 | 10/2011 | Fukano et al. |
| 8,154,370 B2 | 4/2012 | Ishibashi |

FOREIGN PATENT DOCUMENTS

| JP | 2004-286112 | 10/2004 |
| JP | 2005-98340 | 4/2005 |
| JP | 2005-214225 | 8/2005 |
| JP | 2009-130335 | 6/2009 |

OTHER PUBLICATIONS

Office Action (2 pages) dated Feb. 5, 2013 issued in corresponding Japanese Application No. 2011-022509 and English translation (4 pages).

*Primary Examiner* — Matthew W Jellett
(74) *Attorney, Agent, or Firm* — Nixon & Vanderhye P.C.

(57) ABSTRACT

An electromagnetic valve includes a valve seat, a valving element, and a solenoid part. The valve seat has an annular shape and defines a valve hole. The solenoid part includes a coil, a core guide part, a fixed core, and a movable core. The coil becomes an electromagnet upon energization thereof. The core guide part is arranged radially inward of the coil. The movable core is accommodated and reciprocated inside the core guide part in accordance with whether the electromagnet is turned on or off. The valving element moves integrally with the movable core to open or close the valve hole. The core guide part includes a magnetic unbalance part where magnetic force applied between the core guide part and the movable core is different between on one side and the other side of the core guide part in its radial direction.

9 Claims, 7 Drawing Sheets

ELECTROMAGNETIC VALVE

CROSS REFERENCE TO RELATED APPLICATION

This is a divisional of U.S. application Ser. No. 13/365,506, filed Feb. 3, 2012, which claims priority to Japanese Patent Application No. 2011-022509, filed on Feb. 4, 2011, the disclosures of both of which are incorporated herein by reference.

BACKGROUND OF THE INVENTION

1. Field of the Invention

The present invention relates to an electromagnetic valve whose valving element is actuated by utilizing magnetic force of an electromagnet.

2. Description of Related Art

An example of a conventional normally-closed electromagnetic valve will be described. In the normally-closed electromagnetic valve, an electromagnet is produced by energization of a coil. A movable core is attracted to and contacts with a fixed core magnetized by the electromagnet, so that a valving element attached to the movable core is disengaged from a valve seat to cause the electromagnetic valve to be open. When the energization of the coil is stopped and magnetic force of the electromagnet disappears, the movable core is pushed back in an opposite direction from the fixed core by reactive force of a return spring, and the valving element is engaged with the valve seat, thereby to close the electromagnetic valve. In the above-described electromagnetic valve, for example, an elastic body such as rubber can be used for the valving element. In this case, by the repeated opening and closing operation of the valving element for a long period, plastic deformations such as wear and creep are produced in the valving element and the valve seat, so that the valving element and the valve seat are shaped to conform to each other. Thus, a sealing performance when the valving element sits on the valve seat is improved as time passes. However, if the movable core, to which the valving element is attached, rotates while the movable core is attracted and moves to the fixed core, the above-described portions of the valving element and the valve seat, which are conformed in form with each other, are relatively shifted from each other. Therefore, the sealing performance when the valving element sits on the valve seat cannot be maintained.

For the measures against this problem, a technology (see, JP2005-214225A, JP2005-98340A) is known. According to this technology, the movable core is attracted on radially one side of a cylindrical core guide part for guiding the movable core when the movable core is attracted and moves to the fixed core. In JP2005-214225A, the center of the return spring which urges the movable core is eccentrically arranged relative to the central axis of the movable core, so that the movable core is pressed against one side of the core guide part and rotation of the movable core is limited. In JP2005-98340A, a gap expansion part, which expands a gap between the movable core and the core guide part, is formed on an outer periphery of the movable core, or an attachment center of an impact absorbing means, which is attached to the movable core, is made eccentric from the center of the movable core. As a result, the movable core is pushed against one side of the core guide part, and rotation of the movable core is prevented.

However, in JP2005-214225A, because an action center of urging force of the return spring applied to the movable core is shifted from the center line of the movable core, a sealing load may be one-sided when the valving element sits on the valve seat, and leakage from the electromagnetic valve may occur. In JP2005-98340A, a gravity center of the movable core is shifted from the center line of the movable core, i.e., the gravity center is not located on the same line as the center line of the movable core. Therefore, in the electromagnetic valve disposed in a vehicle, for example, rotation of the movable core may be not limited due to its install direction, an acceleration of the vehicle, a centrifugal force and so on.

SUMMARY OF THE INVENTION

The present invention addresses at least one of the above disadvantages.

According to the present invention, there is provided an electromagnetic valve including a valve seat, a valving element, and a solenoid part. The valve seat has an annular shape and defines a valve hole that opens radially inward of the valve seat. The valving element is provided to be movable between a valve-closing position where the valving element is engaged with the valve seat to close the valve hole and a valve-opening position where the valving element is disengaged from the valve seat to open the valve hole. The solenoid part is configured to drive the valving element by utilizing magnetic force of an electromagnet. The solenoid part includes a coil, a core guide part, a fixed core, and a movable core. The coil becomes the electromagnet upon energization thereof. The core guide part has a cylindrical shape and is arranged radially inward of the coil to form a magnetic circuit. The fixed core is arranged on one end side of the core guide part in an axial direction of the core guide part and is magnetized by the electromagnet. The movable core is accommodated inside the core guide part to be opposed to the fixed core in the axial direction and is reciprocated inside the core guide part in accordance with whether the electromagnet is turned on or off. The valving element moves integrally with the movable core to open or close the valve hole. The core guide part includes a magnetic unbalance part where the magnetic force applied between the core guide part and the movable core is different between on one side and the other side of the core guide part, which are opposed to each other in a radial direction of the core guide part.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Modes of the invention will be in detail described based on embodiments below.
(First Embodiment)

Figure 4:
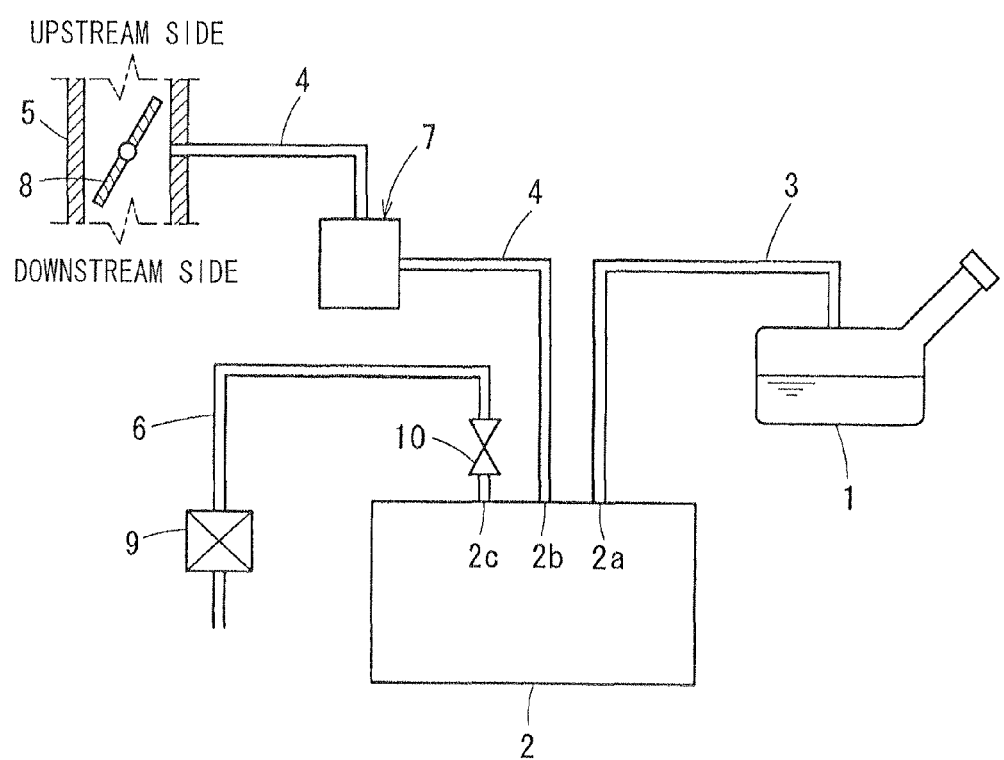
FIG. 4 is a schematic diagram illustrating a fuel vapor treatment system according to the first embodiment.

In a first embodiment, an electromagnetic valve of the invention is applied to a fuel vapor treatment system of a vehicle. As shown in FIG. 4, the fuel vapor treatment system prevents fuel vapor from emitting into the atmosphere. Fuel vapor is evaporated inside a fuel tank 1 disposed in the vehicle, The fuel vapor treatment system includes a canister 2 which temporarily adsorbs and holds fuel vapor leaked from the tank 1. The canister 2 is filled with an adsorption agent such as an activated carbon, which adsorbs fuel vapor. The canister 2 includes a vapor port 2a, a purge port 2b, and an air port 2c. The vapor port 2a is connected to the tank 1 through a vapor passage 3, and the purge port 2b is connected to an intake pipe 5 of an internal combustion engine through a purge passage 4. The air port 2c opens to the atmosphere through an air passage 6.

A purge valve 7 is provided along the purge passage 4. The purge valve 7 regulates a flow volume of fuel vapor, which is suctioned into the intake pipe 5 from the canister 2 by intake negative pressure in the internal combustion engine. The electromagnetic valve of the invention is applied to the purge valve 7. A throttle valve 8 is provided in the intake pipe 5. The purge passage 4 is connected to the intake pipe 5 on a downstream side (internal combustion engine-side) of the throttle valve 8 in an intake-air flow direction. In the air passage 6, a filter 9 and a normally-open canister control valve 10 are provided. The filter 9 filtrates air flowing into the canister 2, and the canister control valve 10 causes the air port 2c of the canister 2 to be closed as necessary. The filter 9 can be incorporated into the purge valve 7, and, in this case, the filter 9 provided in the air passage 6 may be omitted.

Figure 1:
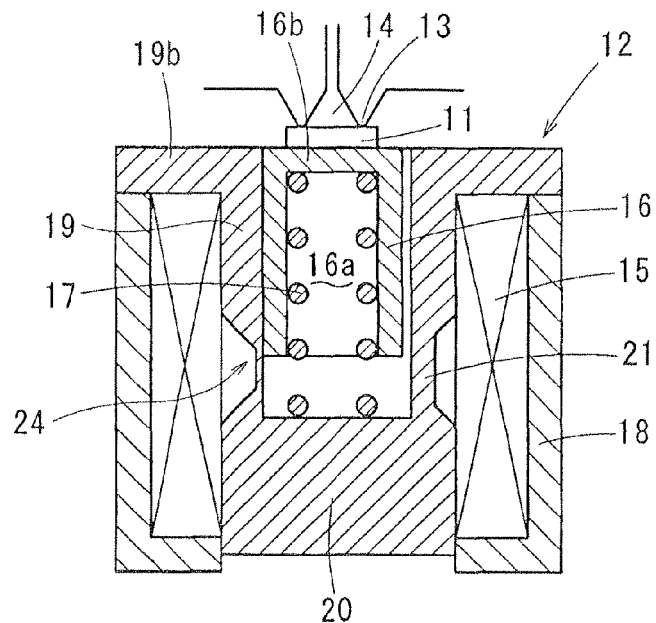
FIG. 1 is a sectional view illustrating a solenoid part according to a first embodiment of the invention.

A structure of the purge valve 7 of the invention will be described referring to FIG. 1. The purge valve 7 includes a housing (not shown), a valving element 11, and a solenoid part 12. The housing defines a connection passage communicating with the purge passage 4. The valving element 11 is accommodated inside the housing, and the solenoid part 12 actuates the valving element 11 by utilizing magnetic force of an electromagnet. The connection passage of the housing includes an inflow port, an outflow port, and a communication passage. The inflow port is connected to the purge passage 4 on an upstream side (canister 2-side) of the purge valve 7 in a flow direction of fuel vapor, and the outflow port is connected to the purge passage 4 on a downstream side (intake pipe 5-side) of the purge valve 7 in the flow direction of fuel vapor. The inflow port and the outflow port communicate with each other through the communication passage. An annular valve seat 13 is provided in the communication passage. The valving element 11 is made of, for example, rubber elastic body (e.g., fluorine-contained rubber, silicon rubber) and can cause a valve hole 14 to be opened and closed. The valve hole 14 opens radially inward of the valve seat 13. When the valving element 11 is engaged with the valve seat 13 to close the valve hole 14, a communication between the inflow port and the outflow port is closed. When the valving element 11 is disengaged from the valve seat 13 to open the valve hole 14, the communication between the inflow port and the outflow port is made.

The solenoid part 12 includes a coil 15, a magnetic-circuit forming member, a movable core 16, and a coil spring 17. The coil 15 is wound around a bobbin (not shown) having an insulation property, and the magnetic-circuit forming member forms a magnetic circuit around the coil 15. The movable core 16 moves in an axial direction of the coil 15 (in a vertical direction in FIG. 1), and the coil spring 17 urges the movable core 16 in one direction. The coil 15 is energized and controlled by an engine control unit (ECU) via a drive circuit (not shown) and becomes an electromagnet as a result of the supply of an excitation current. The magnetic-circuit forming member includes a yoke 18, a core guide part 19, and a fixed core 20. The yoke 18 is a part of the magnetic circuit located on an outer periphery of the coil 15. The core guide part 19 is a part of the magnetic circuit located on an inner periphery of the coil 15. The fixed core 20 is located on one side of the core guide part 19 in the axial direction of the coil 15. The yoke 18 includes an outer-periphery yoke part and a bottom yoke part. The outer-periphery yoke part covers the outer periphery of the coil 15 along an entire length of the coil 15 in the axial direction of the coil 15. The bottom yoke part covers an end surface of the coil 15 on the one side of the coil 15 in the axial direction.

The core guide part 19 has a cylindrical shape coaxially with the coil 15 and defines a guide hole 19a (see FIG. 3A) in which the movable core 16 is contained. An inner surface of the guide hole 19a is a cylindrical surface which has a constant inner diameter entirely in its longitudinal direction. A core plate 19b is integrally formed with the core guide part 19 on an opposite side from the fixed core 20 (on the other side of the core guide part 19) in the axial direction. The core plate 19b extends radially outward from the core guide part 19 to have a flange-like shape. The core plate 19b covers an end surface of the coil 15 on the other side of the coil 15 in the axial direction and is a part of the magnetic circuit which is connected to the yoke 18. In the core guide part 19, a magnetic saturation part 21 and a magnetic unbalance part 24 are provided. The fixed core 20 serves as an attraction part, which attracts the movable core 16 in the axial direction due to magnetization of the fixed core 20 by energization of the coil 15. As shown in FIG. 1, the fixed core 20 is integrally provided with the core guide part 19, but these two can be separately provided from each other.

The movable core 16 is contained in the guide hole 19a defined by the core guide part 19, and moves in the guide hole 19a in the axial direction (vertical direction in FIG. 1) of the core guide part 19, facing to the fixed core 20. The movable core 16 having a cylindrical shape defines a spring chamber 16a inside an inner periphery of the movable core 16. An opening of the movable core 16 on an opposite side thereof from the fixed core 20 is closed by an end board 16b, to which the valving element 11 is attached. An outer circumferential surface of the movable core 16 is a cylindrical surface which has a constant outer diameter entirely in its longitudinal direction. The outer diameter is slightly smaller than the inner diameter of the guide hole 19a, so that the movable core 16 can be reciprocated in the axial direction of the core guide part 19 in the guide hole 19a. The coil spring 17 is accommodated in the spring chamber 16a of the movable core 16 and located coaxially with the movable core 16. An end part of the coil spring 17 on its one end side in an axial direction thereof is supported by an end surface of the fixed core 20, and an end part of the coil spring 17 on its other end side in the axial direction thereof is supported by the end board 16b of the movable core 16. Thus, the coil spring 17 urges the movable core 16 in an opposite direction from the fixed core 20 (in an upper direction in FIG. 1), i.e., in a closing direction in which the valving element 11 is engaged with the valve seat 13 to close the valve hole 14.

Figure 3A:
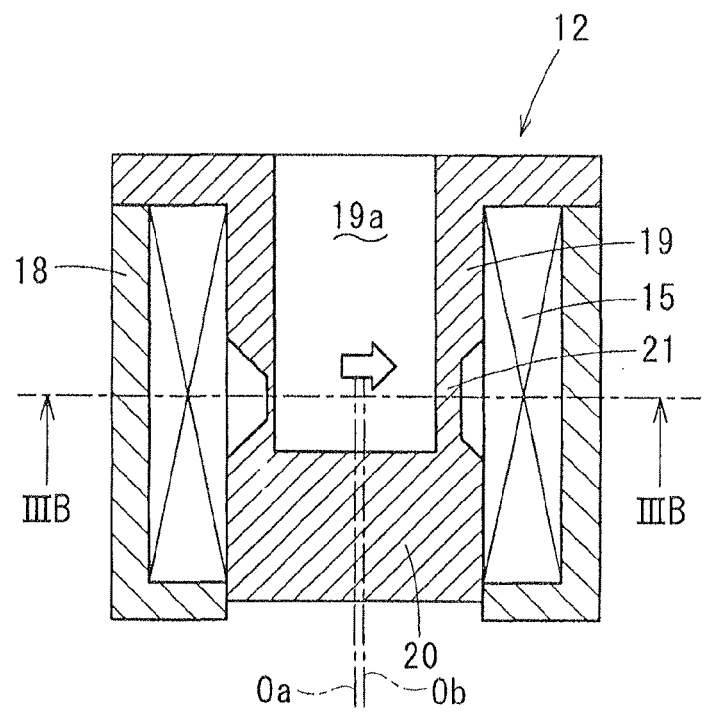
FIG. 3A is a sectional view illustrating the solenoid part excluding the movable core according to the first embodiment.
Figure 3B:
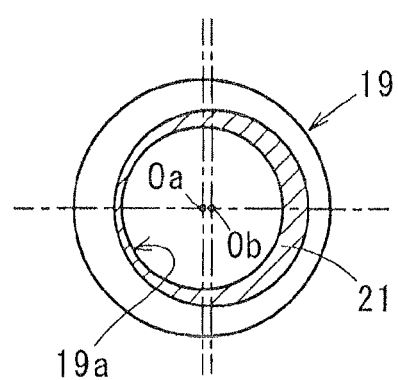
FIG. 3B is a cross-sectional view taken along a line IIIB-IIIB of FIG. 3A and illustrating a magnetic saturation part provided in the core guide part.

The magnetic saturation part 21 and the magnetic unbalance part 24, which are provided in the core guide part 19, will be described referring to FIGS. 3A and 3B. As shown in FIG. 3A, the magnetic saturation part 21 is provided in the core guide part 19 by forming a recessed part on an entire outer circumference of the core guide part 19 in vicinity to the fixed core 20 to reduce a thickness of the core guide part 19. Thus, the magnetic saturation part 21, where magnetic resistance is enhanced by the reduction of a cross-sectional area (thickness) of the magnetic circuit (core guide part 19), is provided in an entire circumference of the core guide part 19. By forming the magnetic saturation part 21 in the core guide part 19, a magnetic flux flowing directly from the core guide part 19 to the fixed core 20 decreases. Hence, a magnetic force applied between the core guide part 19 and the movable core 16 increases by the decrease of the magnetic flux. Therefore, an attraction force acting between the core guide part 19 and the movable core 16 increases.

The magnetic unbalance part 24 is provided such that the magnetic circuit area of the magnetic saturation part 21 provided in the core guide part 19, i.e., the cross-sectional area of the thickness-reduced part of the core guide part 19 is different between on one side and the other side of the core guide part 19, which are opposed to each other in the radial direction of the core guide part 19. That is, magnetic forces, which act between the core guide part 19 and the movable core 16, on the one side and on the other side of the core guide part 19 in the radial direction are different from each other. Specifically, as shown in FIG. 3B, the unbalance part 24 is provided at a position where the outer diameter center Oa of the core guide part 19 (an inner diameter center of the guide hole 19a) is eccentrically located relative to an outer diameter center Ob of the magnetic saturation part 21. As indicated by an arrow in FIG. 3A, the magnetic saturation part 21 is leaned to the other side (right side in FIG. 3A) of the core guide part 19 as a whole in the radial direction of the core guide part 19. The cross-sectional area of the magnetic saturation part 21 as the magnetic circuit is not constant along the entire circumference of the core guide part 19, thereby being smaller on a left side than on a right side of the core guide part 19 in FIG. 3B.

Magnetic forces, which act between the core guide part 19 and the movable core 16, are different between on the one side and the other side of the core guide part 19, which are opposed to one another in the radial direction. In the present embodiment, the one side of the core guide part 19 has a smaller magnetic circuit area than the other side thereof in the radial direction. Hence, the magnetic force on the one side of the core guide part 19 more strongly acts between the core guide part 19 and the movable core 16 than on the other side of the core guide part 19 in the radial direction. Thus, the movable core 16 is attracted to the one side of the core guide part 19 in the guide hole 19a. As described above, the magnetic saturation part 21 is leaned entirely to the other side of the core guide part 19 in the radial direction. Therefore, as shown in FIG. 3B, the cross-sectional area of the magnetic saturation part 21 as the magnetic circuit (the cross-sectional area of the thickness-reduced part) gradually change in a circumferential direction of the core guide part 19 without drastically changing between the smallest area part and the largest area part of the magnetic saturation part 21.

Figure 2:
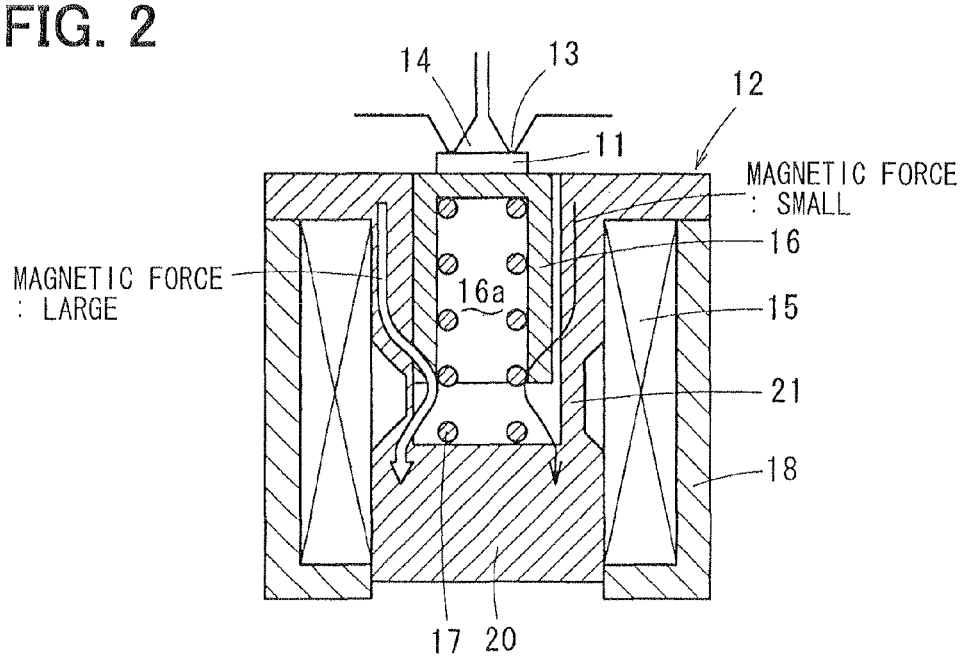
FIG. 2 is a sectional view of the solenoid part illustrating unbalance magnetic force applied between a core guide part and a movable core according to the first embodiment.

An operation and effect of the purge valve 7 of the first embodiment will be described. The magnetic unbalance part 24 is provided in the core guide part 19, which is provided in the solenoid part 12 of the purge valve 7 of the present embodiment. More specifically, the cross-sectional magnetic circuit area of the magnetic saturation part 21 (the cross-sectional area of the thickness-reduced part) is smaller on the one side than on the other side of the core guide part 19 which is opposed to the one side in the radial direction. The saturation part 21 functions as the magnetic circuit and is provided for the entire circumference of the core guide part 19. Consequently, magnetic resistance in the magnetic saturation part 21 becomes large on the one side of the core guide part 19, which has a smaller cross-sectional area of the magnetic circuit than the other side of the core guide part 19. Therefore, as indicated in thickness of arrows in FIG. 2, the magnetic force, which acts between the core guide part 19 and the movable core 16, on the one side of the core guide part 19 becomes large relative to the magnetic force on the other side of the core guide part 19.

When the movable core 16 is attracted to the fixed core 20 magnetized by energization of the coil 15, i.e., when the movable core 16 moves in the guide hole 19a in the axial direction of the core guide part 19, the movable core 16 is attracted to and contacts with the one side of the core guide part 19 in the radial direction, where magnetic force more strongly acts on the movable core 16. Accordingly, rotation of the movable core 16 is prevented. Because the unbalance part 24 is not provided in the movable core 16, a gravity center of the movable core 16 is not shifted from a radial center thereof. Therefore, because the gravity center of the movable core 16 is located at the radial center thereof, rotation of the movable core 16 due to, for example, its install direction with respect to the vehicle, an acceleration of the vehicle, or a centrifugal force does not occur.

The valving element 11 attached to the end board 16b of the movable core 16 is always engaged with the same position of the valve seat 13 at closing time when the valve hole 14 is closed. Hence, as a result of the repeated opening and closing operation of the valving element 11, the valving element 11 and the valve seat 13 are shaped to conform with each other, and sealing performance at the closing time is improved. The movable core 16 is attracted to and contacts with the one side of the core guide part 19 in the radial direction when the movable core 16 moves in the guide hole 19a. Thus, sliding resistance is produced between the movable core 16 and the core guide part 19, and travel speed of the movable core 16 thereby becomes slow. As a result, an impact noise, which is produced when the movable core 16 contacts with the fixed core 20, is reduced.

(Second Embodiment)

Figure 5A:
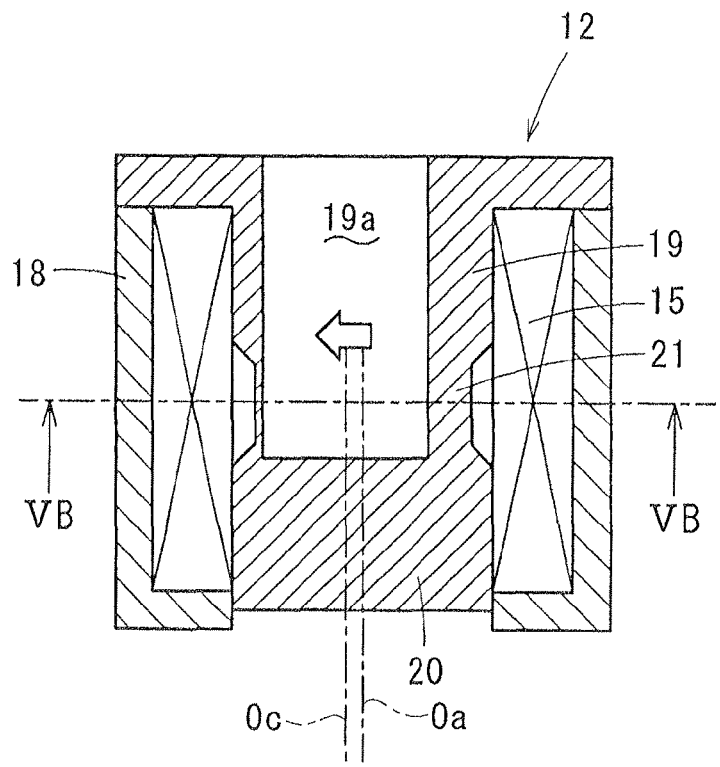
FIG. 5A is a sectional view illustrating a solenoid part excluding a movable core according to a second embodiment of the invention.
Figure 5B:
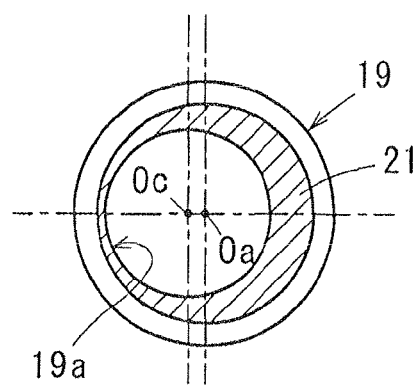
FIG. 5B is a cross-sectional view taken along a line VB-VB of FIG. 5A and illustrating a magnetic saturation part provided in a core guide part.

As shown in FIGS. 5A and 5B, a second embodiment is an example in which a magnetic unbalance part 24 is provided by positioning an inner diameter center Oc of a guide hole 19a eccentrically relative to an outer diameter center Oa of a core guide part 19. A magnetic saturation part 21 is provided in the core guide part 19 such that a recessed part is formed on an outer peripheral surface of the core guide part 19, and a depth of the recessed part is constant along the entire circumference of the core guide part 19. That is, the outer diameter center Oa of the core guide part 19 is located at the same position as a position of an outer diameter center Ob of the magnetic saturation part 21. As shown in FIG. 5B, the inner diameter center Oc of the guide hole 19a defined by the core guide part 19 is eccentrically positioned on one side (left side in FIG. 5A) of the core guide part 19 in a radial direction of the core guide part 19 with respect to the outer diameter center Oa of the core guide part 19. Therefore, the entire portion of the guide hole 19a is formed unevenly on the one side of the core guide part 19 in the radial direction.

A magnetic-path cross-sectional area of the magnetic saturation part 21 (a cross-sectional area of a thickness-reduced part) is smaller on the one side than on the other side of the core guide part 19, which is opposed to the one side in the radial direction. The magnetic saturation part 21 functions as a magnetic circuit and is formed along an entire circumference of the core guide part 19. Consequently, similar to the first embodiment, magnetic resistance in the magnetic saturation part 21 is large on the one side of the core guide part 19, which has a smaller cross-sectional area of the magnetic circuit than the other side of the core guide part 19. Therefore, a magnetic force, which acts between the core guide part 19 and the movable core 16, on the one side of the core guide part 19 is large relative to a magnetic force on the other side of the core guide part 19. When the movable core 16 moves in the guide hole 19a in an axial direction of the core guide part 19, the movable core 16 is attracted to and contacts with the one side of the core guide part 19 in the radial direction, where magnetic force more strongly acts on the movable core 16. Thus, rotation of the movable core 16 is prevented. Accordingly, similar effects (e.g., improvement of sealing performance at valve closing time, and noise abatement) to the first embodiment can be obtained.

(Third Embodiment)

Figure 6A:
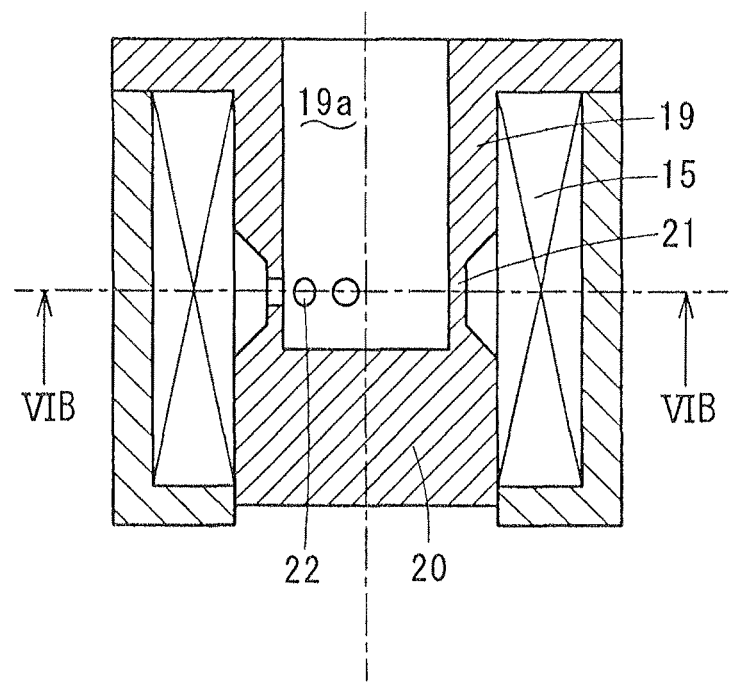
FIG. 6A is a sectional view illustrating a solenoid part excluding a movable core according to a third embodiment of the invention.
Figure 6B:
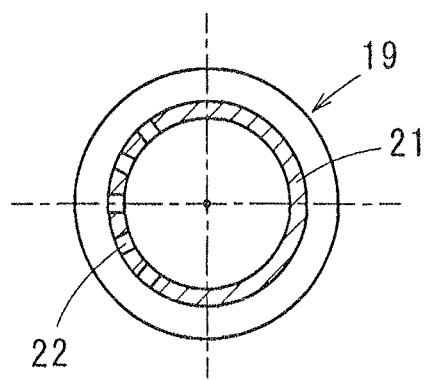
FIG. 6B is a cross-sectional view taken along a line VIB-VIB of FIG. 6A and illustrating a magnetic saturation part provided in a core guide part.

As shown in FIGS. 6A and 6B, a third embodiment is an example in which a magnetic unbalance part 24 is provided by boring a through hole 22 on a circumferential wall of a core guide part 19. If the through hole 22 is bored on the circumferential wall of the core guide part 19 including a magnetic saturation part 21, a cross-sectional area of the magnetic saturation part 21 as a magnetic circuit is further reduced and magnetic resistance increases. As shown in FIG. 6B, if several through holes 22 are provided only for one side (left side in FIG. 6A) of the core guide part 19 in a radial direction of the core guide part 19, magnetic resistance on the one side of the magnetic saturation part 21 in the radial direction becomes large relative to magnetic resistance on the other side of the magnetic saturation part 21, which is opposed to the one side in the radial direction. Thus, when a movable core 16 moves in the guide hole 19a in an axial direction of the core guide part 19, the movable core 16 is attracted to and contacts with the one side of the core guide part 19 in the radial direction, where magnetic force more strongly acts on the movable core 16. Accordingly, rotation of the movable core 16 is prevented. The through hole 22 can be formed by laser radiation, cutting, water jet cutting, or press working, for example. In FIGS. 6A and 6B, several through holes 22 are provided only for the one side of the core guide part 19, which is opposed to the other side in the radial direction. However, a magnetic unbalance part 24 can be provided such that through holes 22 are provided also on the other side of the core guide part 19 in the radial direction and the number of the through holes 22 on the other side is less than the number of the through holes 22 on the one side.

(Fourth Embodiment)

A fourth embodiment is another case that a magnetic unbalance part 24 is provided by boring a through hole 22 on a circumferential wall of a core guide part 19. In the example of the above-described third embodiment, the several through holes 22 are provided only for the one side of the core guide part 19, which is opposed to the other side in the radial direction of the core guide part 19.

Figure 7A:
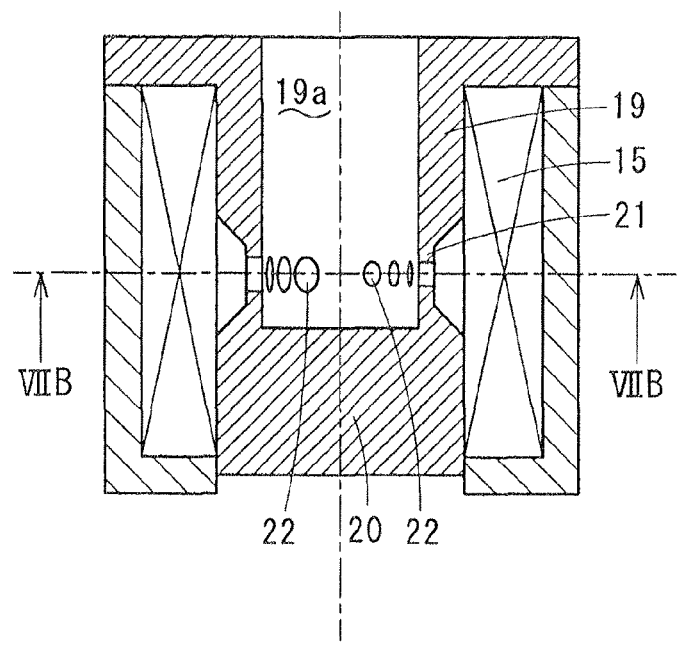
FIG. 7A is a sectional view illustrating a solenoid part excluding a movable core according to a fourth embodiment of the invention.
Figure 7B:
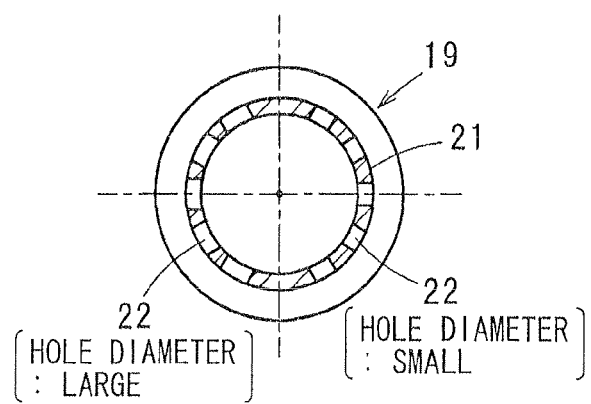
FIG. 7B is a cross-sectional view taken along a line VIIB-VIIB of FIG. 7A and illustrating a magnetic saturation part provided in a core guide part.

However, as shown in FIGS. 7A and 7B, in the fourth embodiment, the magnetic unbalance part 24 is provided by providing the same number of the through holes 22 both on one side (left side in FIG. 7A) and the other side of a magnetic saturation part 21, which are opposed each other in a radial direction of the core guide part 19, and by changing diameters of the through holes 22. In the example as shown in FIGS. 7A and 7B, the diameters of the through holes 22 are larger on the one side than on the other side of the magnetic saturation part 21 in the radial direction. Accordingly, magnetic resistance is larger on the one side than on the other side of the magnetic saturation part 21 in the radial direction. Therefore, when a movable core 16 moves in the guide hole 19a in an axial direction of the core guide part 19, the movable core 16 is attracted to and contacts with the one side of the core guide part 19 in the radial direction, where a magnetic force more strongly acts on the movable core 16, and rotation of the movable core 16 is prevented.

(Fifth Embodiment)

Figure 8:
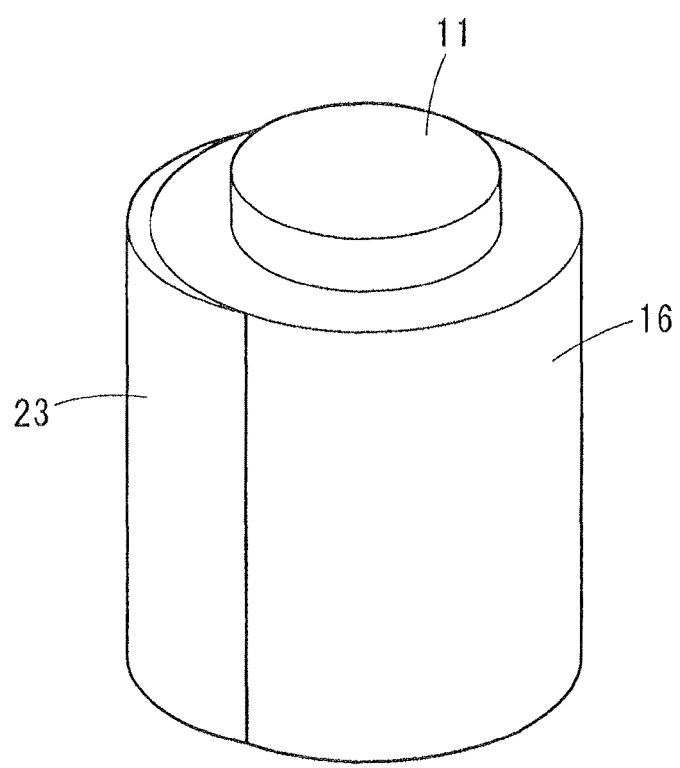
FIG. 8 is a perspective view illustrating a movable core according to a fifth embodiment of the invention.

A fifth embodiment is a case that a coating agent 23 is applied to an outer circumferential surface of a movable core 16, which is attracted to and contacts with one side of a core guide part 19 in a radial direction of a core guide part 19 when the movable core 16 is attracted to a fixed core 20 and moves in a guide hole 19a in an axial direction of the core guide part 19. In the first to fourth embodiments, because the magnetic resistance is larger on the one side than on the other side of the core guide part 19 in the radial direction, the movable core 16 is attracted to and contacts with the one side of the core guide part 19. Accordingly, rotation of the movable core 16 is prevented. In this case, when the movable core 16 moves in the guide hole 19a, the outer circumferential surface of the movable core 16 which slides on an inner circumferential surface of the guide hole 19a, i.e., a sliding surface of the movable core 16 is areally almost fixed. In other words, the sliding surface is within an almost fixed range in a circumferential direction of the movable core 16. Thus, as shown in FIG. 8, it is enough to apply the coating agent 23 only for the sliding surface of the movable core 16, which is attracted to and contacts with the core guide part 19, and the coating agent 23 need not be applied to the entire outer circumferential surface of the movable core 16. Therefore, a consumption amount of the coating agent 23 can be reduced.

Modifications of the above embodiments will be described. In the first embodiment, the electromagnetic valve of the invention is applied to the purge valve 7 utilized in the fuel vapor treatment system of the vehicle. However, the electromagnetic valve can be applied to the canister control valve 10. The electromagnetic valve of the invention can be applied also to, for example, an hydraulic control valve utilized in a valve timing control device of an internal combustion engine, or an hydraulic solenoid utilized in an automatic gear shifting device of an vehicle.

To sum up, the electromagnetic valve of the above embodiments may be described as follows.

The electromagnetic valve includes the valve seat 13, the valving element 11, and the solenoid part 12. The valve seat 13 has the annular shape and defines the valve hole 14 that opens radially inward of the valve seat 13. The valving element 11 is movable between the valve-closing position where the valving element 11 is engaged with the valve seat 13 to close the valve hole 14 and the valve-opening position where the valving element 11 is disengaged from the valve seat 13 to open the valve hole 14. The solenoid part 12 drives the valving element 11 by utilizing magnetic force of the electromagnet. The solenoid part 12 includes the coil 15, the core guide part 19, the fixed core 20, and the movable core 16. The coil 15 becomes the electromagnet upon energization thereof. The core guide part 19 has the cylindrical shape and is arranged radially inward of the coil 15 to form the magnetic circuit. The fixed core 20 is arranged on one end side of the core guide part 19 in the axial direction of the core guide part 19 and is magnetized by the electromagnet. The movable core 16 is accommodated inside the core guide part 19 to be opposed to the fixed core 20 in the axial direction and is reciprocated inside the core guide part 19 in accordance with whether the electromagnet is turned on or off. The valving element 11 moves integrally with the movable core 16 to open or close the valve hole 14. The core guide part 19 includes the magnetic unbalance part 24 where the magnetic force applied between the core guide part 19 and the movable core 16 is different between on one side and the other side of the core guide part 19, which are opposed to each other in the radial direction of the core guide part 19.

In the electromagnetic valve of the invention, the magnetic unbalance part 24 is provided in the core guide part 19, which has the cylindrical shape and is a part of the magnetic circuit located radially inward of the coil 15. More specifically, the magnetic force applied between the movable core 16 and the core guide part 19 is different between on the one side and the other side of the core guide part 19, which are opposed to each other in the radial direction of the core guide part 19. Thus, when the movable core 16 is attracted to the fixed core 20 by the action of the electromagnet, i.e., when the movable core 16 moves inside the guide hole 19a in the axial direction of the core guide part 19, the movable core 16 is attracted to and contacts with one side of the core guide 19 in the radial direction of the core guide part 19 (the one side or the other side of the core guide part 19 in the radial direction of the core guide part 19) where the magnetic force more strongly acts on the movable core 16. Hence, rotation of the movable core 16 may be prevented, and accordingly, the valving element 11 moving integrally with the movable core 16 may be always engaged with the same position of the valve seat 13 at closing time when the valve hole 14 is closed. Therefore, the valving element 11 and the valve seat 13 may be shaped to conform to each other, and thereby, the sealing performance at the closing time can be improved. Additionally, the movable core 16 is attracted to and contacts with one side of the core guide part 19 in the radial direction when the movable core 16 moves inside the core guide part 19. Thus, sliding resistance is produced between the movable core 16 and the core guide part 19. As a result, the travel speed of the movable core 16 becomes slow, and therefore, an impact noise, which is produced when the movable core 16 contacts with the fixed core 20, can be reduced.

The core guide part 19 may include the magnetic saturation part 21 along the entire outer circumference thereof. The magnetic saturation part 21 includes the recessed part on the outer peripheral surface thereof, to reduce the thickness of the core guide part 19, thereby decreasing the magnetic-path cross-sectional area of the magnetic saturation part 21. At the magnetic unbalance part 24, the magnetic-path cross-sectional area of the magnetic saturation part 21 is different between on the one side and the other side of the core guide part 19. In the above-described structure, as the magnetic-path cross-sectional area of the magnetic saturation part 21 is smaller, the magnetic resistance of the core guide part 19, which is the part of the magnetic circuit, may become larger. Thus, the magnetic force applied between the core guide part 19 and the movable core 16 may increase. If a magnetic-path cross-sectional area of one side of the core guide part 19, which is opposed to the other side of the core guide part 19, is made smaller than a magnetic-path cross-sectional area of the other side of the core guide part 19, the magnetic force applied between the core guide part 19 and the movable core 16 may act larger on the one side than on the other side of the core guide part 19. Therefore, the movable core 16 can be attracted to the one side of the core guide part 19.

The outer diameter center Ob of the magnetic saturation part 21 may be positioned eccentrically with respect to the diameter center Oa of the core guide part 19. When the outer diameter center Ob of the magnetic saturation part 21 coincides with the diameter center Oa, a magnetic-path cross-sectional area of the magnetic saturation part 21 is a constant in the circumferential direction of the core guide part 19. However, if the magnetic saturation part 21 is provided such that the outer diameter center Ob of the magnetic saturation part 21 is eccentrically positioned relative to the diameter center Oa of the core guide part 19, the magnetic unbalance part 24 can be provided, where the magnetic-path cross-sectional area of the magnetic saturation part 21 is different between the one side and the other side of the core guide part 19, which are opposed to each other.

The outer diameter center Ob of the magnetic saturation part 21 may coincide with the outer diameter center Oa of the core guide part 19. Additionally, the diameter center Oc of the inner peripheral surface of the core guide part 19, which accommodates the movable core 16, may be located eccentrically with respect to the outer diameter center Oa of the core guide part 19. Specifically, the inner peripheral surface of the core guide part 19 may be shifted to either one side in the radial direction of the core guide part 19 relative to the outer peripheral surface of the core guide part 19 (on the one side or the other side of the core guide part 19). Accordingly, the magnetic unbalance part 24 can be provided, where the magnetic-path cross-sectional area of the magnetic saturation part 21 is different between the one side and the other side of the core guide part 19, which are opposed to each other.

At the magnetic unbalance part 24, the core guide part 19 may include the through hole 22, which passes through the circumferential wall of the core guide part 19, only on the one side or the other side of the core guide part 19. In the above-described structure, because magnetic resistance increases, the magnetic force between the movable core 16 and the core guide part 19 may increase. For example, if the through hole 22 is provided only on one side of the core guide part 19, magnetic resistance of the one side becomes larger than that of the other side of the core guide part 19. Accordingly, the movable core 16 can be attracted to the one side of the core guide part 19, in which the magnetic force applied between the movable core 16 and the core guide part 19 is relatively strong.

At the magnetic unbalance part 24, each of the one side and the other side of the core guide part 19 may include at least one through hole 22, which passes through the circumferential wall of the core guide part 19. Moreover, the number of the through holes 22 on the one side of the core guide part 19 may be different from the number of the through holes 22 on the other side of the core guide part 19. In this instance, the numbers of the through holes 22 passing through the circumferential wall of the core guide part 19 on the one side and on the other side of the core guide part 19 are different from each other. Hence, a magnitude of the magnetic resistance is different between the one side and the other side of the core guide part 19. For example, when the number of the through holes 22 on the one side of the core guide part 19 is larger than the number of the through holes 22 on the other side of the core guide part 19 (here, all the hole diameters of the through holes 22 are of the same size), the one side is larger than the other side in the magnitude of the magnetic resistance. Therefore, the movable core 16 can be attracted to the one side of the core guide part 19, where the magnetic force more strongly acts between the movable core 16 and the core guide part 19.

At the magnetic unbalance part 24, each of the one side and the other side of the core guide part 19 may include a through hole 22, which passes through the circumferential wall of the core guide part 19. Additionally, a diameter of the through hole 22 on the one side of the core guide part 19 and a diameter of the through hole 22 on the other side of the core guide part 19 may be different from each other. In this case, the diameters of the through holes 22 passing through the circumferential wall of the core guide part 19 on the one side and the other side of the core guide part 19, which are opposed to each other, are different from each other. Thus, a magnitude of the magnetic resistance is different between the one side and the other side of the core guide part 19. For example, when the diameter of the through holes 22 on the one side of the core guide core 19 is larger than the diameter of the through holes 22 on the other side of the core guide core 19, the one side is larger than the other side in the magnitude of the magnetic resistance. Therefore, the movable core 16 can be attracted to the one side of the core guide part 19, where the magnetic force more strongly acts between the movable core 16 and the core guide part 19.

The core guide part 19 may include the magnetic saturation part 21 along an entire outer circumference thereof, and the magnetic saturation part 21 includes the recessed part on an outer peripheral surface thereof, to reduce the thickness of the core guide part 19, thereby decreasing the magnetic-path cross-sectional area of the magnetic saturation part 21. Furthermore, the through hole 22 on the one side of the core guide part 19 and the through hole 22 on the other side of the core guide part 19 are provided at the magnetic saturation part 21. By forming the magnetic saturation part 21 in the core guide part 19, a magnetic flux flowing directly from the core guide part 19 to the fixed core 20 decreases. Hence, the magnetic force applied between the core guide part 19 and the movable core 16 increases by the decrease of the magnetic flux. Therefore, an magnetic attraction force acting between the core guide part 19 and the movable core 16 increases. If the magnetic unbalance part 24 is provided by boring the through holes 22 at the magnetic saturation part 21, the movable core 16 can be attracted to one side (either side of the one side or the other side of the core guide part 19 in its radial direction) of the core guide part 19 on which the magnetic force strongly affects to the movable core 16.

Only a part of the outer peripheral surface of the movable core 16, which slides on the inner peripheral surface of the core guide part 19, may be coated with the coating agent 23. In the electromagnetic valve of the invention, when the movable core 16 is attracted to the fixed core 20 and moves inside the core guide part 19 due to the action of the electromagnet, the movable core 16 is attracted to and contacts with one side of the core guide part 19 (either side of one side or the other side of the core guide part 19 in the radial direction), the movable core 16 thereby being prevented from rotating. In this case, the outer circumferential surface of the movable core 16 which slides on the inner circumferential surface of the core guide part 19, i.e., the sliding surface of the movable core 16 is areally almost fixed. In other words, the sliding surface is within an almost fixed range in a circumferential direction of the movable core 16. Thus, the coating agent 23 need not be applied to the entire outer circumferential surface of the movable core 16, and it is enough to apply the coating agent 23 only for the sliding surface of the movable core 16. Therefore, the consumption amount of the coating agent 23 can be reduced.

Additional advantages and modifications will readily occur to those skilled in the art. The invention in its broader terms is therefore not limited to the specific details, representative apparatus, and illustrative examples shown and described.

What is claimed is:

1. An electromagnetic valve comprising:
    a valve seat having an annular shape and defining a valve hole that opens radially inward of the valve seat;
    a valving element provided to be movable between a valve-closing position where the valving element is engaged with the valve seat to close the valve hole and a valve-opening position where the valving element is disengaged from the valve seat to open the valve hole; and
    a solenoid part configured to drive the valving element by utilizing magnetic force of an electromagnet, wherein:
    the solenoid part includes:
        a coil which becomes the electromagnet upon energization thereof;
        a core guide part which has a cylindrical shape and is arranged radially inward of the coil to form a magnetic circuit;
        a fixed core which is arranged on one end side of the core guide part in an axial direction of the core guide part and is magnetized by the electromagnet; and
        a movable core which is accommodated inside the core guide part to be opposed to the fixed core in the axial direction and which is reciprocated inside the core guide part in accordance with whether the electromagnet is turned on or off;
    the valving element moves integrally with the movable core to open or close the valve hole;
    the core guide part includes a magnetic unbalance part where the magnetic force applied between the core guide part and the movable core is different between on one side and the other side of the core guide part, which are opposed to each other in a radial direction of the core guide part; and
    at the magnetic unbalance part, the core guide part includes a through hole, which passes through a circumferential wall of the core guide part, only on the one side or the other side of the core guide part.

2. The electromagnetic valve according to claim 1, wherein:
    the core guide part includes a magnetic saturation part along an entire outer circumference thereof;
    the magnetic saturation part includes a recessed part on an outer peripheral surface thereof, to reduce a thickness of the core guide part, thereby decreasing a magnetic-path cross-sectional area of the magnetic saturation part; and
    the through hole is provided at the magnetic saturation part.

3. An electromagnetic valve comprising:
    a valve seat having an annular shape and defining a valve hole that opens radially inward of the valve seat;
    a valving element provided to be movable between a valve-closing position where the valving element is engaged with the valve seat to close the valve hole and a valve-opening position where the valving element is disengaged from the valve seat to open the valve hole; and
    a solenoid part configured to drive the valving element by utilizing magnetic force of an electromagnet, wherein:

the solenoid part includes:
a coil which becomes the electromagnet upon energization thereof;
a core guide part which has a cylindrical shape and is arranged radially inward of the coil to form a magnetic circuit;
a fixed core which is arranged on one end side of the core guide part in an axial direction of the core guide part and is magnetized by the electromagnet; and
a movable core which is accommodated inside the core guide part to be opposed to the fixed core in the axial direction and which is reciprocated inside the core guide part in accordance with whether the electromagnet is turned on or off;
the valving element moves integrally with the movable core to open or close the valve hole;
the core guide part includes a magnetic unbalance part where the magnetic force applied between the core guide part and the movable core is different between on one side and the other side of the core guide part, which are opposed to each other in a radial direction of the core guide part;
at the magnetic unbalance part, each of the one side and the other side of the core guide part includes at least one through hole, which passes through a circumferential wall of the core guide part; and
a number of the at least one through hole on the one side of the core guide part is different from a number of the at least one through hole on the other side of the core guide part.

4. The electromagnetic valve according to claim 3, wherein:
the core guide part includes a magnetic saturation part along an entire outer circumference thereof;
the magnetic saturation part includes a recessed part on an outer peripheral surface thereof, to reduce a thickness of the core guide part, thereby decreasing a magnetic-path cross-sectional area of the magnetic saturation part; and
the at least one through hole on the one side of the core guide part and the at least one through hole on the other side of the core guide part are provided at the magnetic saturation part.

5. An electromagnetic valve comprising:
a valve seat having an annular shape and defining a valve hole that opens radially inward of the valve seat;
a valving element provided to be movable between a valve-closing position where the valving element is engaged with the valve seat to close the valve hole and a valve-opening position where the valving element is disengaged from the valve seat to open the valve hole; and
a solenoid part configured to drive the valving element by utilizing magnetic force of an electromagnet, wherein:
the solenoid part includes:
a coil which becomes the electromagnet upon energization thereof;
a core guide part which has a cylindrical shape and is arranged radially inward of the coil to form a magnetic circuit;
a fixed core which is arranged on one end side of the core guide part in an axial direction of the core guide part and is magnetized by the electromagnet; and
a movable core which is accommodated inside the core guide part to be opposed to the fixed core in the axial direction and which is reciprocated inside the core guide part in accordance with whether the electromagnet is turned on or off;
the valving element moves integrally with the movable core to open or close the valve hole;
the core guide part includes a magnetic unbalance part where the magnetic force applied between the core guide part and the movable core is different between on one side and the other side of the core guide part, which are opposed to each other in a radial direction of the core guide part;
at the magnetic unbalance part, each of the one side and the other side of the core guide part includes a through hole, which passes through a circumferential wall of the core guide part; and
a diameter of the through hole on the one side of the core guide part and a diameter of the through hole on the other side of the core guide part are different from each other.

6. The electromagnetic valve according to claim 5, wherein:
the core guide part includes a magnetic saturation part along an entire outer circumference thereof;
the magnetic saturation part includes a recessed part on an outer peripheral surface thereof, to reduce a thickness of the core guide part, thereby decreasing a magnetic-path cross-sectional area of the magnetic saturation part; and
the through hole on the one side of the core guide part and the through hole on the other side of the core guide part are provided at the magnetic saturation part.

7. The electromagnetic valve according to claim 1, wherein the core guide part includes multiple through holes, which each pass through a circumferential wall of the core guide part in a same circumference of the core guide part in an axial direction.

8. The electromagnetic valve according to claim 3, wherein the core guide part includes multiple through holes, which each pass through a circumferential wall of the core guide part in a same circumference of the core guide part in an axial direction.

9. The electromagnetic valve according to claim 5, wherein the core guide part includes multiple through holes, which each pass through a circumferential wall of the core guide part in a same circumference of the core guide part in an axial direction.

\* \* \* \* \*